United States Patent [19]

Reisdorff

[11] Patent Number: 4,932,623
[45] Date of Patent: Jun. 12, 1990

[54] BRACKET

[75] Inventor: Robert A. Reisdorff, Seward, Nebr.

[73] Assignee: Hughes Brothers, Inc., Seward, Nebr.

[21] Appl. No.: 191,279

[22] Filed: May 6, 1988

[51] Int. Cl.$^5$ .............................................. E04G 3/00
[52] U.S. Cl. .................................... 248/219.3; 52/697
[58] Field of Search ............... 248/219.3, 219.4, 218.4, 248/219.1; 211/107; 52/40, 697, 721; 174/45 R, 158

[56] References Cited

U.S. PATENT DOCUMENTS

| 868,591 | 10/1907 | Yaxley | 52/697 |
| 882,835 | 3/1908 | McGillivray | 248/219.3 X |
| 1,029,207 | 6/1912 | Megahan | 52/40 X |
| 1,802,995 | 4/1931 | Williams | 248/219.3 X |
| 2,721,362 | 10/1955 | McCoy | 52/40 X |
| 2,884,670 | 5/1959 | Garrison et al. | 248/219.4 X |
| 4,728,749 | 3/1988 | Knight | 52/697 X |

FOREIGN PATENT DOCUMENTS 34312   5/1929   France ..................... 248/218.4

Primary Examiner—J. Franklin Foss
Attorney, Agent, or Firm—Vincent L. Carney

[57] ABSTRACT

To mount a cross-arm bracket to a utility pole, a c-shaped cross-arm engaging portion of a bracket fits over a cross-arm with the open end of the C facing the utility pole and the cross-arm fitting within the C. A utility pole engaging portion of the bracket has flanges extending outwardly and bolted to the pole. The cross-arm engaging portion and the utility pole engaging portion are integrally formed of sheet metal, bent into the shape of the cross-arm bracket.

9 Claims, 7 Drawing Sheets

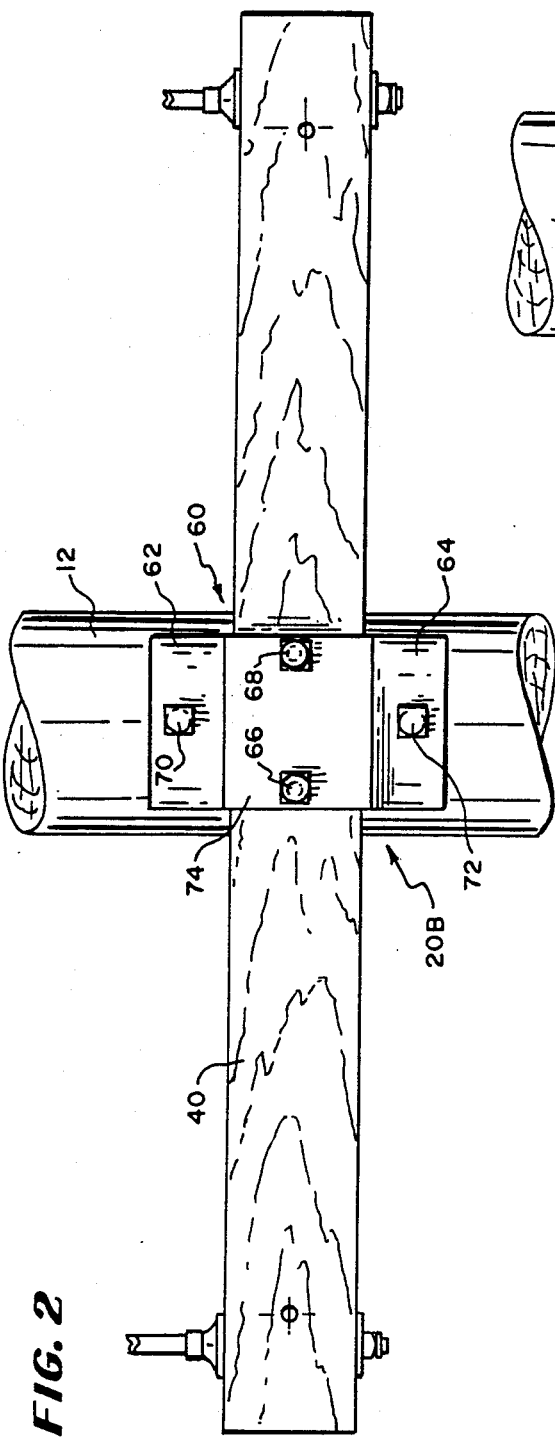
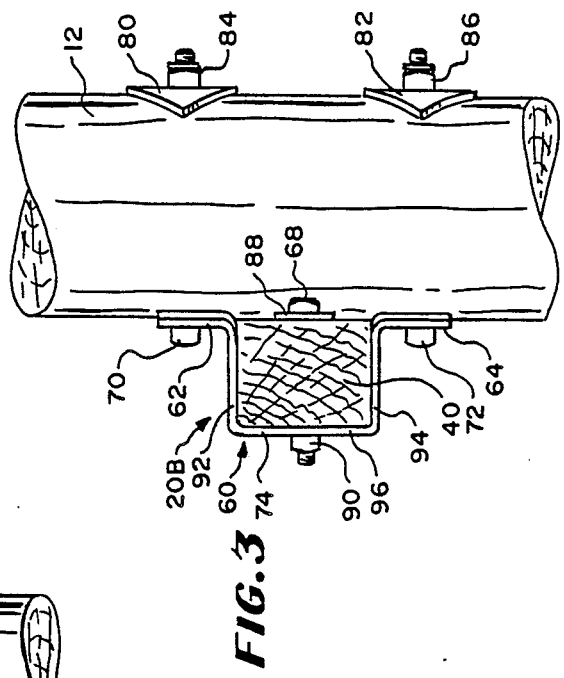
FIG. 2
FIG. 3

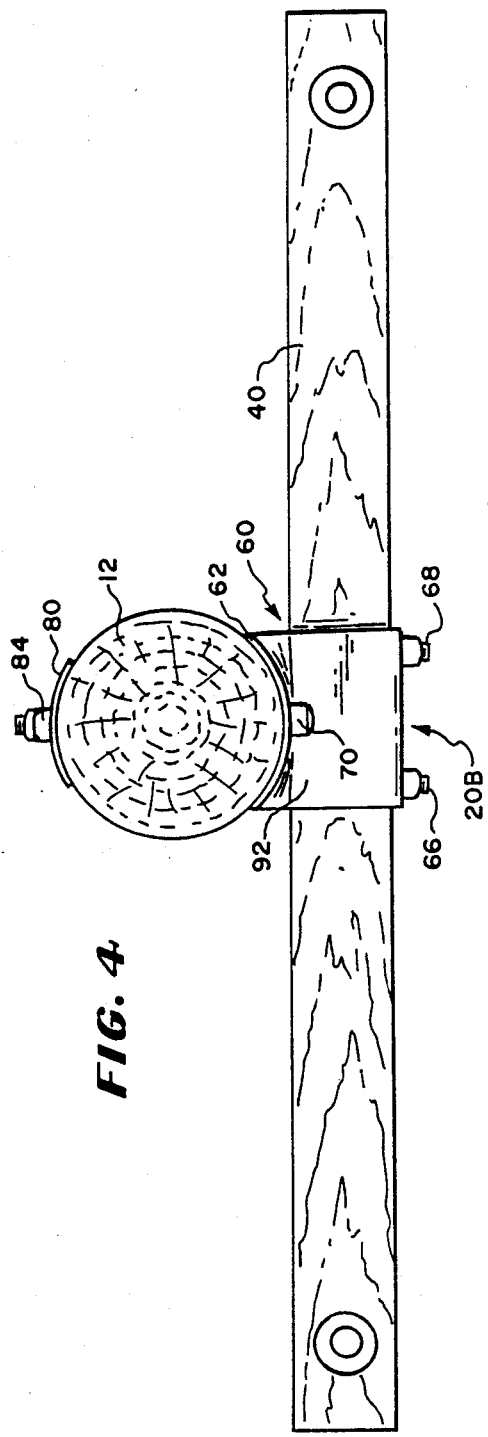
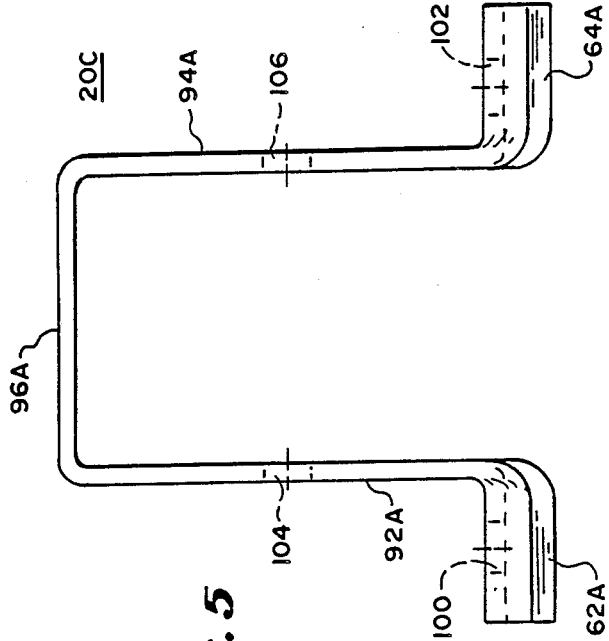
FIG. 4
FIG. 5

BRACKET

BACKGROUND OF THE INVENTION

This invention relates to brackets used to mount crossarms to utility poles supporting electrical conductors.

One class of bracket is fastened to a crossarm by bolts that pass through the crossarm and through the bracket and is fastened to a utility pole by bolts passing through the utility pole and the bracket.

One type of prior art bracket of this class includes multiple parts that engage the crossarm in addition to the bolts. Single piece brackets are known and are made commonly of fiberglass or plastic. They are generally tubular to surround a crossarm.

The prior art brackets have the disadvantage of being expensive or not providing a sufficiently sturdy mount to the pole to maintain spacing between high voltage conductors.

SUMMARY OF THE INVENTION

Accordingly, it is an object of this invention to provide a novel bracket.

It is a further object of the invention to provide a novel method of making a bracket.

It is a still further object of the invention to provide a novel sheet metal blank which may be bent to form a single piece bracket for crossarms used on utility poles.

In accordance with the above and other objects of the invention, a sheet metal blank is stamped to a predetermined shape having a thickness of between 1/32 inch and 1 inch, a length of between 4 inches and 36 inches, and a width of between 2 inches and 36 inches. After the sheet metal blank has been stamped, one or more utility-pole bolt apertures for the utility pole bolts are drilled near its ends and one or more crossarm apertures are drilled.

In one embodiment, the shape is a right regular parallelopiped. In this embodiment, apertures for the utility pole bolts are drilled near each of its ends and a pair of crossarm apertures are drilled at locations equally-distanced from the center of the blank and closer to the center than are the end apertures so that they are located on the sides of the bracket when the blank is bent to form a bracket.

The sheet metal blank is bent to form a crossarm bracket with the aperture either substantially at the center or with a central portion forming a first section of a crossarm engaging portion of the bracket and two aligned apertures being spaced beyond the bends in second and third sections. The end apertures are in flanges which extend outwardly from the second and third sections.

The crossarm bracket has first, second and third sections. The first section has a height extending in substantially the same direction of and being as long as the width of the crossarm in the direction of the longitudinal axis of the utility pole to which the crossarm and crossarm bracket will be attached. The second and third sections are integrally formed with the first section and extend orthogonally from it, being parallel to each other, and having lengths corresponding to the depth of the crossarm extending from the edges of the first section to the utillity pole to which the crossarm is to be attached. The first, second and third sections are intended to be in intimate contact with corresponding sides of the crossarm, with the first section being in contact with the front surface and the second and third sections being in contact with the parallel side surfaces extending from the front surface to the utility pole.

To fasten the bracket to the utility pole, flanges extend outwardly from the second and third sections and are bent to form a radius which is substantially the same as the radius of the pole. Bolts pass through bolt holes in the flanges to hold the bracket to the pole and the crossarm is fastened to the crossarm engaging portion of the bracket by any convenient means such as for example, bolts.

In another embodiment, the sheet metal blank is stamped as an integral unit with first and second continuous sections that are right regular parallelopipeds and a third section extending from the second section and having a shape in plan of a truncated triangle but with the same thickness as the first and second sections. Holes are drilled or otherwise formed: (1) in some embodiments in the first section to permit bolts to pass through the first section, holes in the crossarm and holes in the pole; (2) in some embodiments in the second section to permit bolts to pass through the second section and holes in the crossarm but not the pole; and (3) in the third section to permit one or more bolts to pass through the third section and holes in the pole.

To form the bracket, the first and second sections of the blank are bent with respect to each other to form a first section of the bracket that engages the outer surface of the crossarm, and a second section of the bracket extending orthogonally from the first section along the side of the crossarm and toward the pole. The second section of the blank is bent with respect to the third section to form a third section of the bracket parallel to the first section of the bracket, the outer surface of the crossarm and the longitudinal axis of the pole.

In still another embodiment of bracket, the blank has first, second, third, fourth, fifth, sixth and seventh sections, the first, second and third sections being shaped as contiguous right regular parallelopipeds, the fourth and sixth forming a first truncated triangle extending from the second section and the fifth and seventh sections forming a second truncated triangle extending from the third section.

Holes are drilled or otherwise formed: (1) in some embodiments in the first section to permit bolts to pass through the first section and the crossarm or through the first section, the crossarm and the pole; (2) through the second and third sections to permit different bolts to pass through corresponding holes in the second and third sections and corresponding aligned holes in the crossarm; and (3) in the sixth and seventh sections to permit bolts to pass through the sixth and seventh sections and the pole.

To form the bracket, the second and third blank sections are bent orthogonally to the first blank section along opposite edges of the first blank section toward the same side so they are parallel to each other, thus defining a first bracket section substantially coextensive with the first blank section and sized to fit conformingly over the outer surface of a crossarm. The fourth and fifth blank sections are each bent outwardly at an angle with respect to the second and third sections to define second and third sections of the bracket extending along the sides of the crossarm part of the distance to the pole. The sixth and seventh bracket sections are bent further outwardly with respect to the fourth and fifth sections to be parallel to the first section and to the pole to form sixth and seventh bracket sections. The second and third bracket sections are parallel to each other, the fourth and fifth sections each extend at an angle from respective ones of the second and third sections, and the sixth and seventh sections each extend at an angle to respective ones of the fourth and fifth sections and are in the same plan with each other and parallel with the first section After this process, the bracket has a first section that lies against the outer surface of the crossarm, second and third sections each of which extends part way along opposite sides of the crossarm, fourth and fifth sections each of which extend outwardly from the crossarm and to the pole, and sixth and seventh sections that lie along the pole contain bolt holes for fastening to the pole. The first section may also include one or more holes to fasten them to the crossarm and pōle with bolts and the second and third sections may include aligned bolt holes to permit fastening to the crossarm.

As can be understood from the above description, the brackets of this invention have several advantages such as: (1) they are easily fabricated from sheet metal; (2) they are inexpensive; and (3) they are capable of securing crossarms and well enough so that the conductors they support will not be moved in proximity to each other by heavy winds or storms to cause damage.

SUMMARY OF THE DRAWINGS

The above noted and other features of the invention will be better understood from the following detailed description when illustrated by the accompanying drawings in which:

FIG. 2 is a fragmentary elevational view of a crossarm and crossarm bracket mounted to a utility pole in accordance with an embodiment of the invention;

FIG. 3 is a fragmentary side elevational view of the bracket, crossarm and utility pole of FIG. 2;

FIG. 4 is a plan view partly sectioned of the bracket, crossarm and utility pole of FIGS. 1-3;

FIG. 5 is an elevational view of another embodiment of a crossarm bracket;

DETAILED DESCRIPTION

Figure 1:
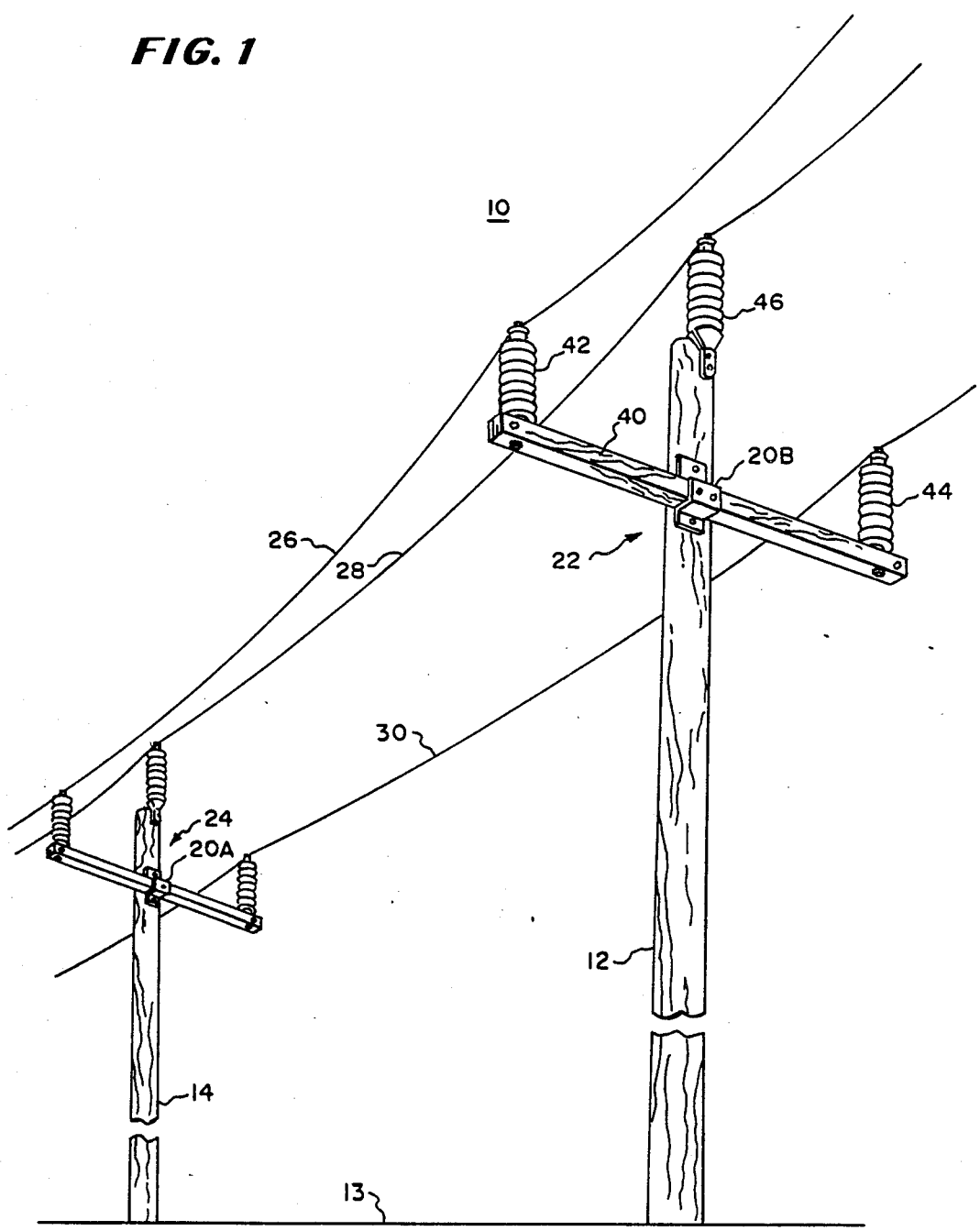
FIG. 1 is a fragmentary broken away perspective view of power lines supporting three-phase high voltage conductors with the utility poles having crossarms connected to the pole by brackets.

In FIG. 1, there is shown a fragmentary perspective view of one embodiment single pole power system 10 including a plurality of poles 12 and 14, and a plurality of three-phase high-voltage conductor support systems 22 and 24. The poles 12 and 14 extend from the ground 13 and support the three-phase high-voltage conductors 26, 28 and 30 to transmit power across the terrain.

The three-phase high-voltage conductor support system 22 includes a crossarm 40, a first insulator 42, a second insulator 44 and a third insulator 46. The crossarm 40 is mounted orthogonally to the longitudinal axis of the pole 12 and has mounted on each end a different one of the first and second insulators 42 and 44. In the embodiment of FIG. 1, the third insulator 46 is mounted to the top of pole 12 but in other embodiments, one of which is described hereunder in connection with FIG. 9, the third insulator may be mounted to the crossarm. Moreover, a large number of insulators carrying a corresponding larger number of conductors may be mounted to the crossarm. While a three phase system is described above, support systems for other phase arrangements or numbers of phases can be accommodated by the invention.

The first, second and thrid insulators 42, 44 and 46 each carry a corresponding one of the high -voltage conductors 26, 28 and 30 and hold them in a spaced relationship to maintain their phase-to-support and phase-to-ground relationship. The insulators: (1) space the conductors from the pole and crossarm and adequate distance to avoid conduction along the surface of the wood or through the wood or damage to the wood by grounding of the conductors; and (2) mount the conductors a sufficient distance from each other to avoid conduction through the air or ionization of the air under any conditions. Moreover, they are mounted to withstand the highest winds expected in the area and the largest amount of snow, sleet or ice expected. The three-phase high-voltage conductor support system 24 is similar in construction to the three-phase high-voltage conductor support system 22.

To support the crossarm 40, a crossarm bracket 20B is bolted to the crossarm 40 and to the pole 12. The three-phase high-voltage conductor support system 24 for the pole 14 is similarly constructed and will not be seperately described hereinafter.

The crossarm bracket 20B is formed as one continuous piece from cold formed or rolled steel and bent into a shape easily fastened to the crossarm 40 and the pole 12. In spite of its simple construction, it provides sufficient stability and strength to maintain swaying and motion of the crossarm within a close enough tolerance to avoid having the conductors 26, 28 and 30 be moved too close together by the forces of wind or snow or other inclement weather. In some cases crossarm braces may be added for additional vertical stability.

In FIG. 2, there is shown a fragmentary view of a pole 12, a wooden crossarm 40 and a crossarm bracket 20B, mounted together with the crossarm 40 being held in place on the wooden pole 12 and orthogonal thereto by the crossarm bracket 20B. The crossarm 40 is held securely enough so that even in heavy winds or sleet, it does not move so much as to cause the conductors 26, 28 and 30 (FIG. 1) to move into close proximity with each other rather than being held apart by their respective crossarms.

To hold the crossarm 40 against the pole 12 and orthogonally thereto, the crossarm bracket 20B includes a crossarm engaging portion 60, a first ple engaging portion 62 and a second pole engaging portion 64. The crossarm engaging portion 60 includes a front surfae 74 shown in FIG. 2 and side members which extend to the first and second pole engaging portions 62 and 64 with which they are integrally formed. First and second crossarm engaging bolts 66 and 68 extend orthogonally through the front surface 74 of the crossarm engaging portion 60 through the crossarm 40 and hold the crossarm 40 to the crossarm engaging portion 60.

The front surface 74 of the crossarm engaging portion 60 has a height in the direction of the longitudinal axis of the pole and crossways to the longitudinal axis of the crossarm 40 sufficiently long so that its inner surface between the side arms conforms to the distance perpendicular to the longitudinal axis of the crossarm 40 across the crossarm 40 to permit the crossarm 40 to be encompassed within the crossarm engaging portion 60. Its width perpendicular to the height is at least ½ times the diameter of the pole and no more than the diameter of the pole, being between 3 inches and 24 inches.

The first pole engaging portion 62 and the second pole engaging portion 64 extend outwardly in the direction of the longitudinal axis of the pole 12, each being adapted to receive a different one of the bolts 70 and 72 which pass through them and through the pole 12 to hold them to the pole. In the preferred embodiment, they have the same width as the surface 74 but may in other embodiments have a longer or shorter width. However, they should have a width of at least ½ the diameter of the pole 12 and a width no longer than the pole 12, thus falling within the range of widths of the top surface 74.

To enable the first and second pole engaging portions 62 and 64 to firmly engaging the surface of the pole 12, the first and second pole engaging portions are curved to conform to the curvature of the pole 12 and extend outwardly a sufficient length to prevent pivoting of the crossarm 40. The radius of curvature of the pole engaging portions is in the range of 3 inches and 12 inches.

In FIG. 3, there is shown a fragmentary side elevational view of the crossarm bracket 20B, the pole 12 and the crossarm 40 with the crossarm 40 being sectioned. As shown in this view, the crossarm engaging portion is geneally C-shaped and confines the crossarm 40 within it on three sides. The bolts 66 (FIG. 2) and 68 (only bolt 68 being shown in FIG. 3) pass through the top surface 74 of the crossarm engaging portion 60 of the crossarm bracket 20B and through the crossarm 40. They are fastened by nuts, one of which is shown at 90 at a location adjacent to the pole 12 and on the same side of the pole as the crossarm 40.

With this structure, the crossarm 40 is held within the crossarm engaging portion 60 by two bolts, two nuts and two bearing plates which press the crossarm 40 within the crossarm engaging portion 60, one bolt 68, a corresponding annular bearing plate 88 around the shank of the bolt 68 and a corresponding nut 90 being shown in FIG. 3. On the remaining side, the side of the crossarm 40 is placed in contact with, or only slightly spaced from the pole 12 to be held thereagainst.

The crossarm engaging portion 60 includes sides 92 and 94 integrally formed with the top surface 74 and integrally formed with the first and second pole engaging portions 62 and 64, being formed from the same sheet metal. Generally, the length of the surfaces 92 and 94 corresponds on their inner surface to the depth of the crossarm 40 and are within a range of 2 inches to 10 inches. In the preferred embodiment, it is substantially 4 ½ inches. Generally, the material is ⅛ inch to 1 inch in thickness and made of steel or aluminum although it may be made of any other suitable material. The crossarm 40 is typically of wood.

The first and second pole engaging portions 62 and 64 are integrally formed with the side sections 92 and 94 and the adjoining top section 96 and extend outwardly form the bottom edges of the side sections 92 and 94 a length of between 1 inch and 12 inches, but in the preferred embodiment are approximately ½ the height of the top surfaces 74 in the direction of the longitudinal axis of the pole 12. They include a radius of curvature the same as that of the pole 12 (not shown in FIG. 3) and are of uniform thickness, the entire bracket being formed of cold rolled steel or sheet aluminum bent to its appropriate shape and punched or drilled for bolt holes.

To fasten the first and second pole engaging portions 62 and 64 to the utility pole 12, each of the first and second pole engaging portions 62 and 64 includes holes to accommodate bolts such as the bolts 70 and 72 which pass through the pole and through bearing plates 80 and 82 for holding with the nuts 84 and 86 respectively which are threaded against the bearing plate to squeeze the pole 12 between the first and second pole engaging portions 62 and 64 and the bearing plates 80 and 82 by tightening the nuts 84 and 86.

In FIG. 4, there is shown a plan view of the crossarm 40 and crossarm bracket 20B mounted to a pole 12 (sectioned). As shown in this view, the first and second pole engaging portions 62 and 64 (the first pole engaging portion 62 being shown in FIG. 4) are bent to match the curvature of the pole 12 to conformably mount the bracket 20B to a pole by two bolts, one through each of the first and second pole engaging portions 62 and 64 (bolt 70 only being shown in FIG. 4 passing through the first pole engaging portion 62).

With this arrangement, the crossarm bracket 20B and crossarm 40 may be preassembled for mounting to the poles. Holes may be drilled, through the utility poles to receive the bolts and the crossarm 40 lifted in place with the crossarm bracket 20B and easily and quickly fastened. Although the crossarm bracket 20B is simple and formed by a simple bending operation, suprisingly, it provides sufficient stability for even areas with high winds and snow.

In FIG. 5, there is shown an elevational view of another embodiment of crossarm bracket 20C being formed substantially the same as the crossarm bracket 20B (FIGS. 1-4) out of a single sheet of steel or aluminum and containing engaging portions substantially the same as the first and second pole engaging portions 62 and 64 of the embodiment of FIG. 2, but indicated in FIG. 5 as 62A and 64A. Similarly, bolt holes 100 and 102 are located in the pole engaging portions 62A and 64A which contain a radius on their internal surface for mounting to a pole.

However, the side sections 92A and 92B include bolt holes, two of which are indicated at 104 and 106, aligned with each other whereas the bolt holes in the embodiment of crossarm bracket 20B (FIG. 3) the side sections 92 and 94 have no bolts holes but the top section 96 does have bolt holes. In the embodiment of crossarm bracket 20C in this FIG. 5, there are no bolt holes in the top section 96A and bolts pass through the sides to mount a crossarm within the bracket.

Figure 6:
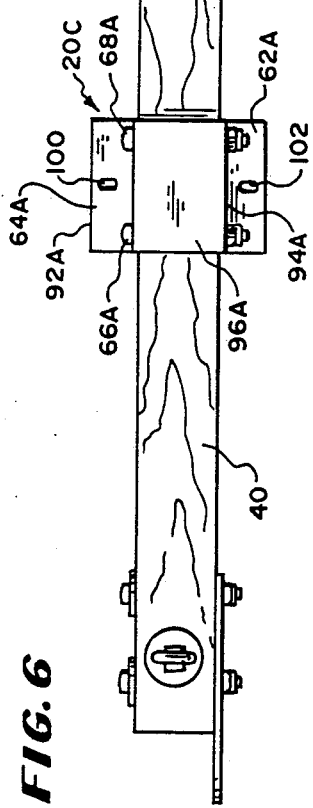
FIG. 6 is an elevational view of the crossarm bracket of FIG. 5 and a crossarm.
Figure 7:
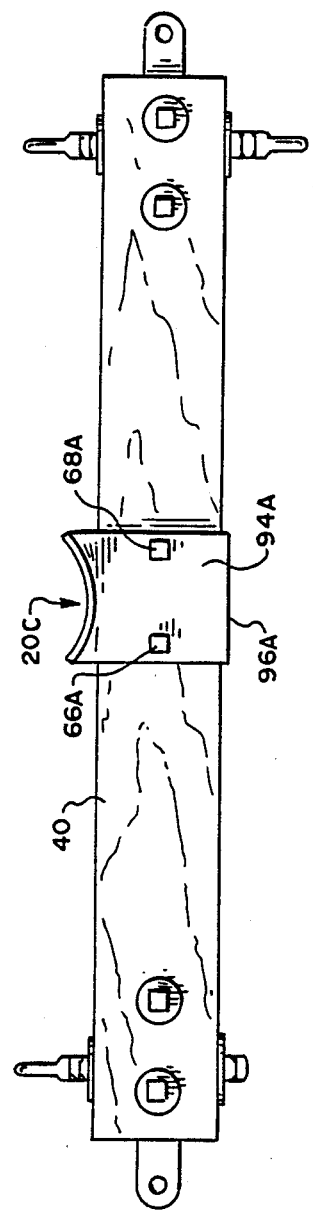
FIG. 7 is a plan view of the bracket and crossarm of FIG. 6.

In FIGS. 6 and 7, there is shown an elevational view and a top view, respectively, of a combination crossarm 40 and crossarm bracket 20C substantially the same as the combination crossarm 40 and bracket 20B of FIGS. 1-4 but showing the embodiment of bracket 20C mounted to a crossarm with bolts 66A and 68A passing through the side sections 92A and 94A.

Regardless of the location and number of bolts, the bracket may be preassembled to the crossarm and the combination bracket and crossarm may be quickly and easily assembled to the pole. Moreover, the bracket may be inexpensively formed by stamping, punching and bending steel or aluminum plate.

Figure 8:
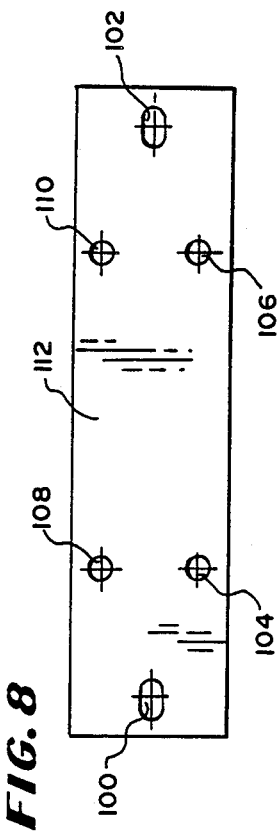
FIG. 8 is a plan view of a sheet metal blank from which the bracket of FIG. 7 is made.

In FIG. 8, there is shown a blank 112 of sheet metal such as steel or aluminum prior to being formed into the crossarm bracket 20C (FIGS. 5-7), which blank is shaped as a right regular parallelopiped with a length equal to the length of the edge of the crossarm engaging portion and flange portions added together and a width equal to the height of the crossarm bracket 20C. The side bolt holes for holding the crossarm 40 in place are shown at 104, 106, 108 and 110 with the pair of holes 104 and 108 being aligned with each other and the pair of holes 106 and 110 being aligned with each other in the same plane on the blank 112 in positions so that, when the bracket is formed by being the blank 112, they are aligned in parallel planes on opposite sides of the bracket. With this arrangement a line passing through the center of the holes 104 and 106 is parallel to a line passing through the centers of the holes 108-110 in the bracket.

The bolt holes 100 and 102 are each closer to different ends of the blank 112 than respective pairs of holes 104, 108 and 106, 110, each being at a distance shorter from its respective end than the length of the flanges (pole engaging portions) of the bracket so that they will be located on the pole engaging portions of the finished bracket.

The pair of holes 104 and 108 are spaced a longer distance away from the pair of holes 106 and 110 than the height of the top section 96A (FIG. 6) and a shorter distance than the combined length of the top section 96A, and the side sections 92A and 94A to permit the blank 112 to be bent forming a top section and flanges with the pairs of holes 104 and 108 being aligned horizontally in the same plane on one side of the bracket when mounted and with the holes 106 and 110 beindg aligned in the same plane on the other side of the bracket.

To form the crossarm bracket 20C (FIGS. 5-7) the blank 112 is bent along four lines perpendicular to its longitudinal axis. The bends along the inner two lines are in the same direction to form the top (first side) of the bracket and the top edges of the second and third sides of the bracket. The bends along the outer two lines are outwardly to form flanges that lie in the same plane and to form the bottom edges of the second and third surface. The plane of the flanges is parallel to the plane of the first side and the flanges extend in a direction away from the first side. The end portions are also bent to have a radius along the axes parallel with the longitudinal axes of the blank 112 with a radius of curvature conforming to the pole so as to form the pole engaging portion, that radius of curvature being between 3 and 12 inches.

More specifically, to form the top section, a bend of about 90 degress is made along each line of a first pair of lines that are spaced equally from a center line orthogonal to the longitudinal axis of the blank 112. The two lines of the pair of lines are spaced from each other a distance equal to the height of the top portion 96A of the crossarm bracket 20C (FIGS. 5-7). The two bends define a portion of the blank 112 that forms the top portion (first side 96A, FIG. 6) and a different edge of each of the two side portions (second and third sides 92A and 94A respectively, FIG. 6). The bends are located such that holes 104, 106, 108 and 110 are aligned.

To form the edges of the second and third side 92A and 94A that are also edges of the first pole engaging portions 62A and 64A (FIGS. 5 and 6), two further bends are formed at locations that are equally distanced from the center of the length of the blank 112. The lines are each spaced from a different end of the blank 112 by a distance that is equal to the length of the first and second pole engaging portions 62A and 64A to form flanges extending at 90 degrees from the downwardly extending side sections 92A and 94A to be substantially parallel with the top portion 96A (FIG. 6). The bolt holes 100 and 102 are now substantially centered between the edges of the flanges.

To permit the flanges to be in intimate contact with a utility pole, a radius is formed by bending the edges of the flanges downwardly from the center along the center line of the blank 112 to form a radius of curvature. This is done on each flange to result in a radius of curvature which matches the radius of curvature of the utility pole.

The width of the blank 112 is between ¼ the diameter of the pole to which it is to be attached and no wider than the diameter of the pole, being in the range of 4 inches and 12 inches. Its length is in the range of 8 inches to 24 inches.

Figure 9:
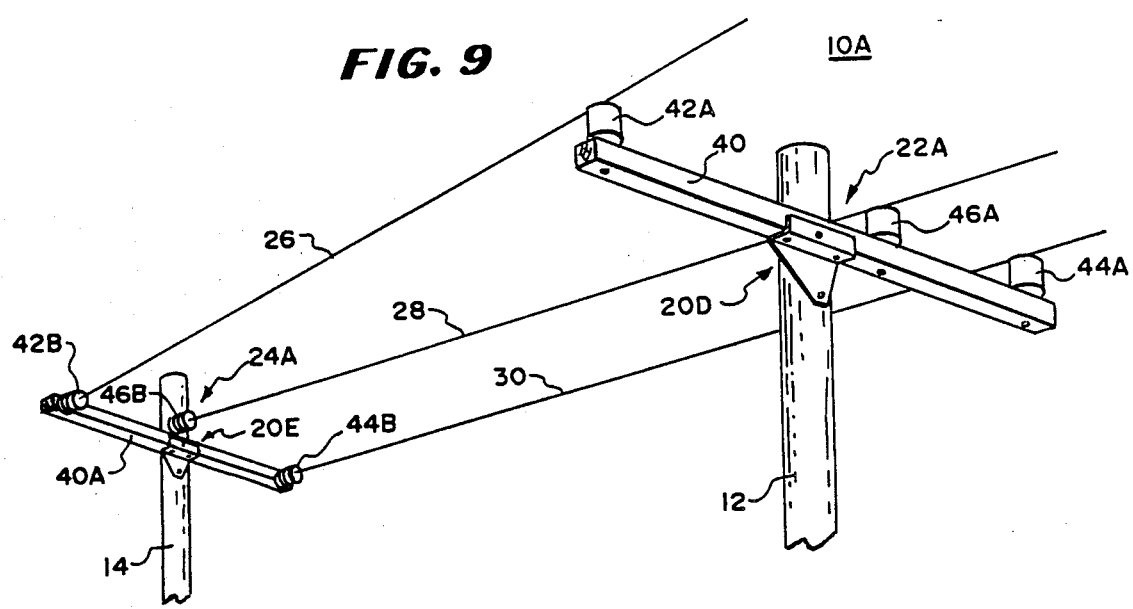
FIG. 9 is a fragmentary broken away perspective view of power lines supporting three-phase high voltage conductors with the utility poles having crossarms connected to the pole and to each other by brackets that are another embodiment of the invention.

In FIG. 9, there is shown a fragmentary perspective view of another embodiment single pole power system 10A including a plurality of poles 12 and 14, and a plurality of three-phase high-voltage conductor support systems 22A and 24A. The poles 12 and 14 and conductors may be the same as those of the embodiment of FIG. 1 and contain the same numbers herein.

The three-phase high-voltage conductor support system 22A includes a crossarm 40, a first insulator 42A, a second insulator 44A and a third insulator 46A. In the embodiment of FIG. 9, the crossarm 40 is mounted orthogonally to the longitudinal axis of the pole 12 and has mounted on it in a row the three insulators 42A, 46A and 44A. To support the crossarm 40, a crossarm bracket 20D is bolted to the crossarm 40 and to the pole 12. The three-phase high-voltage conductor support system 24A for the pole 14 includes three insulators 42B, 46B and 44B mounted for a deadend connection and the crossarm bracket 20E for supporting the crossarm 40A for the pole 14 is adapted to support one of the insulators 46B in a manner to be described hereinafter.

The crossarm brackets 20D and 20E are similar to the crossarm brackets 20A-20C in that they are: (1) formed as one continuous piece from cold formed or rolled steel and bent into a shape easily fastened to a crossarm and a pole; (2) simple in construction; and (3) provide sufficient stability and strength to maintain swaying and motion of the crossarm within a close enough tolerance to avoid having the conductors 26, 28 and 30 be moved too close together by the forces of wind or snow or other inclement weather. However they are generally larger in size and adapted for the larger size poles.

Figure 10:
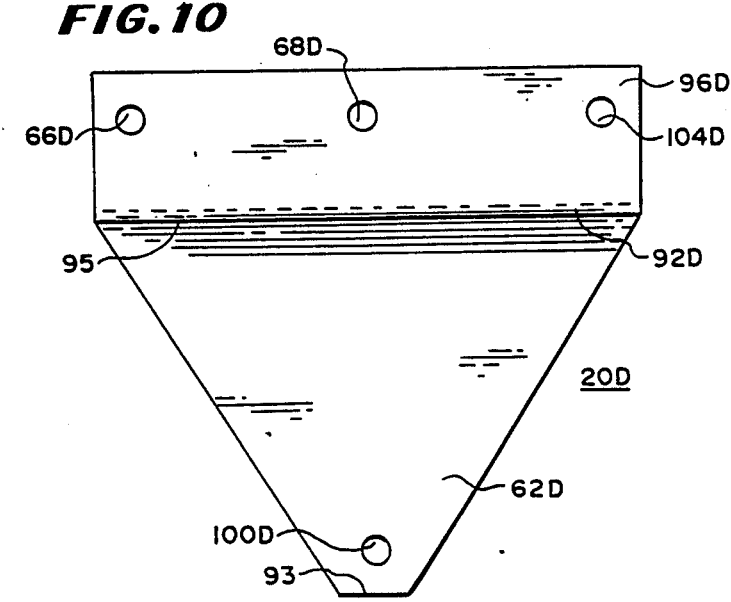
FIG. 10 is an elevational view of another embodiment of a crossarm bracket in accordance with the invention.

In FIG. 10, there is shown an elevational view of another embodiment of crossarm bracket 20D being formed substantially the same as the crossarm bracket 20B (FIGS. 1-4) out of a single sheet of steel or aluminum and containing: (1) a pole engaging portion 62D substantially the same as the first and second pole engaging portions 62 and 64 in the embodiment of FIG. 2, but indicated in FIG. 10 as 62D; (2) a bolt hole 100D located in the pole engaging portion; (3) a side section 92D; and (4) a top section 96D including bolt holes, three of which are indicated at 66D, 68D and 104D. In the embodiment of crossarm bracket 20D in this FIG. 10, there are no bolt holes in the side section 92D.

As shown in FIG. 10, the edge of the pole engaging portion 62D is angled at 30 degrees inwardly from the side section 92D and top section 96D and should be at an angle of between 15 and 50 degrees to form a truncated point at the edge 93 which is parallel to the longitudinal axis of the crossarm and is substantially shorter than the paralled edge 95 of the top section 96D. This arrangement reduces the amount of metal required and thus the weight and cost of the bracket.

Figure 11:
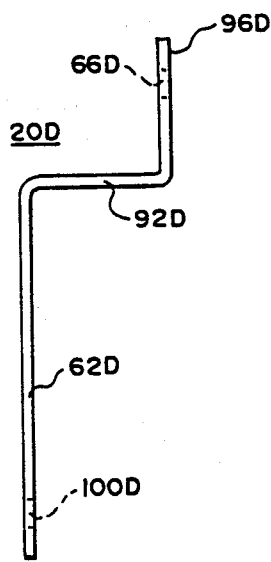
FIG. 11 is a side view of the embodiment of bracket of FIG. 10.

In FIG. 11, there is shown a side elevational view of the crossarm bracket 20D having: (1) the flat top section 96D; (2) the side section 92D extending orthogonally from the top section 96D toward the pole; and (3) a truncated triangular pole engaging section 62D extending orthogonally from the side section 92D. All of the sections have a thickness of between 1/32 inch and 1 inch.

Figure 12:
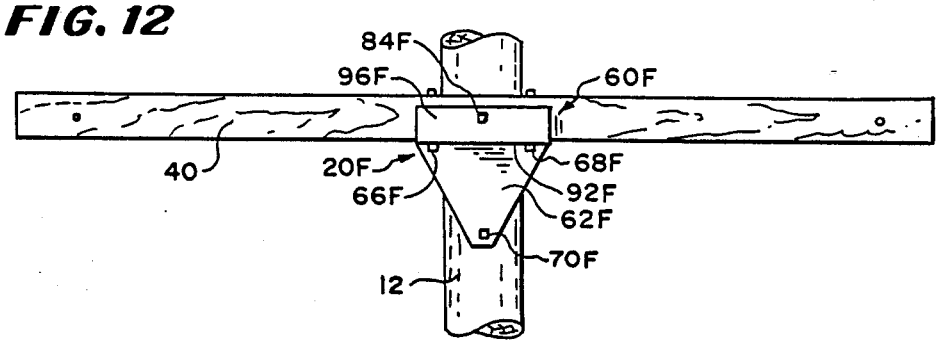
FIG. 12 is a fragmentary elevational view of a crossarm and crossarm bracket mounted to a utility pole in accordance with another embodiment of the invention.

In FIG. 12, there is shown a fragmentary view of a pole 12, a wooden crossarm 40 and a crossarm bracket 20F, mounted together with the crossarm 40 being held in place on the wooden pole 12 and orthogonal thereto by the crossarm bracket 20F. Just as in the prior embodiments, the crossarm 40 is held securely enough in this bracket so that even in heavy winds or sleet, it does not move so much as to cause the conductors 26, 28 and 30 (FIG. 9) to move into close proximity with each other. To hold the crossarm 40 against the pole 12 and orthogonally thereto, the crossarm bracket 20F includes a crossarm engaging portion 60F, a first pole engaging portion 62F, with the crossarm engaging portion 60F including a top section 96F shown in FIG. 12 and a side section 92F which extends to the pole engaging portion 62F with which it is integrally formed. First and second crossarm engaging bolts 66F and 68F extend orthogonally through the side section 92F of the crossarm engaging portion 60F through the crossarm 40 and hold the crossarm 40 to the crossarm engaging portion 60F. A bolt 84F extends through the top section 96F, the crossarm 40 and the pole 12 as described in other embodiments but as in the embodiment of FIGS. 10 and 11 but not the other embodiments the top section 96F need not extend across the entire crossarm.

As in other embodiments, side section 92F of the crossarm engaging portion 60F has a height in the direction of the longitudinal axis of the pole and crossways to the longitudinal axis of the crossarm 40 sufficiently long so that its inner surface between the side arms conforms to the distance perpendicular to the longitudinal axis of the crossarm 40 across the crossarm 40. Its width perpendicular to the height is at least ½ times the diameter of the pole and no more than the diameter of the pole, being between 3 inches and 24 inches.

Figure 13:
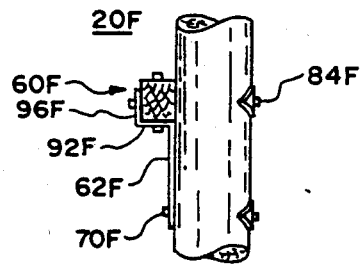
FIG. 13 is a fragmentary side elevational view of the bracket, crossarm and utility pole of FIG. 12.

The pole engaging portion 62F extends outwardly in the direction of the longitudinal axis of the pole 12, being adapted to receive a bolt 70F which passes through it and through the pole 12 to hold it to the pole. Thus, as in some other embodiments only two bolts need extend through the pole to securely hold the crossarm and crossarm bracket. In FIG. 13, there is shown a fragmentary side elevational view of the crossarm bracket 20F, the pole 12 and the crossarm 40 with the crossarm 40 being sectioned. As shown in this view, the crossarm engaging portion is generally L-shaped and holds the crossarm 40 within it on two sides. The bolts 84F and 70F pass through the bracket 20F, the crossarm 40, and the pole 12. They are fastened by nuts at a location adjacent to the pole 12 and on the opposite side of the pole as the crossarm 40. Generally, the thickness of the sheet metal and the size of the side section are the same as in other embodiments but the amount of metal is reduced by reducing the size of the top section 96F and using a truncated triangle for the pole engaging portion.

Figure 14:
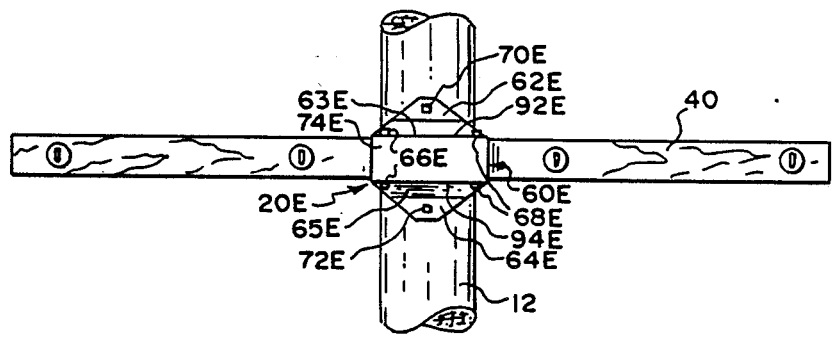
FIG. 14 is a fragmentary elevational view of a crossarm and crossarm bracket mounted to a utility pole in accordance with another embodiment of the invention.

In FIG. 14, there is shown a fragmentary view of a pole 12, a wooden crossarm 40 and a crossarm bracket 20E, mounted together with the crossarm 40 being held in place on the wooden pole 12 orthogonal thereto by the crossarm bracket 20E. The crossarm 40 is held securely enough so that even in heavy winds or sleet, it does not move so much as to cause the conductors 26, 28 and 30 (FIG. 1) to move into close proximity with each other rather than being held apart by their respective crossarms.

The crossarm bracket 20E, is similar to the bracket 20D (FIGS. 9-11) in that it includes pole engaging sections that are shaped as truncated triangles and to the bracket 20B in that it includes two pole engaging sections 62E and 64E, one on each side of the crossarm engaging portion 60E. However, it includes two connecting sections 63E and 65E that extend from the side engaging sections 92E and 94E respectively to the pole engaging sections 62E and 64E respectively. The connecting sections 63E and 65E form portions of a triangular section of the bracket and extend outwardly from a midportion of the sides of the crossarm 40 and toward the pole 12, where they meet the integrally formed pole engaging portions.

As in the other embodiments, the pole engaging portions include bolt holes for receiving bolts 70E and 72E for mounting to the pole and the side portions include bolt holes for receiving bolts 66E and 68E for connecting the bracket to the crossarm. This embodiment is especially useful for deadending since the insulator may be mounted to a clevis which is in turn mounted to the bolt 70E.

Figure 15:
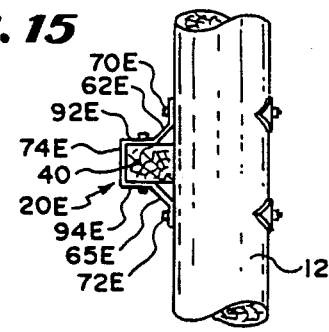
FIG. 15 is a fragmentary side elevational view of the bracket, crossarm and utility pole of FIG. 14.

In FIG. 15, there is shown a fragmentary side elevational view of the crossarm bracket 20E, the pole 12 and the crossarm 40 with the crossarm 40 being sectioned. As shown in this view, the crossarm engaging portion is generally C-shaped and confines the outer portion of the crossarm 40 within it on three sides. However, to save metal, in addition to being tapered, the connecting sections extend at an angle to the pole engaging sections to provide support without as much metal being necessary.

Figure 16:
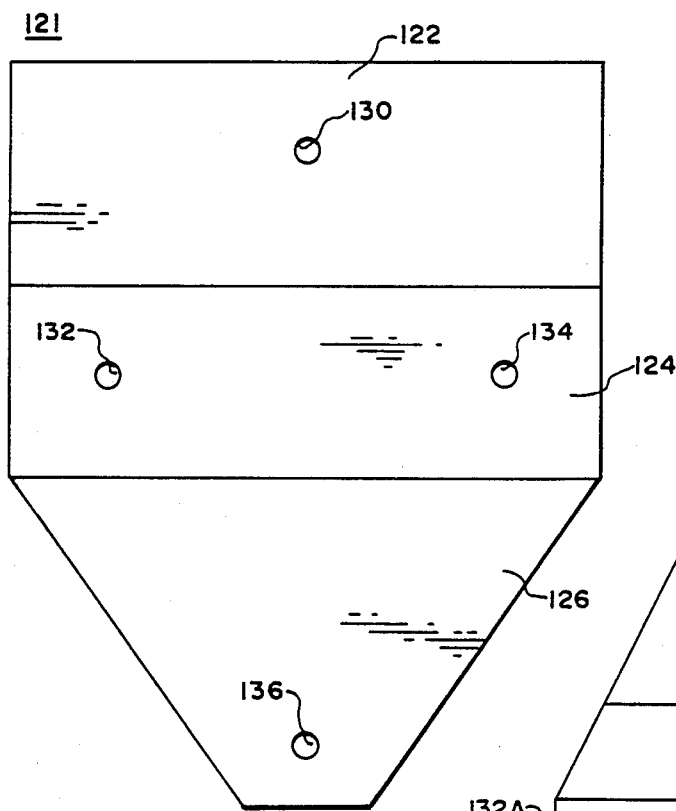
FIG. 16 is a sheet metal blank from which the crossarm brackets of FIGS. 10, 11, 12 and 13 may be formed.

In FIG. 16, there is shown a blank 121 of rolled steel or aluminum useful in forming the crossarm bracket 20F. The blank 121 has a thickness of between 1/32 inch and 1 inch and is generally stamped from cold rolled steel or aluminum, punched drilled or otherwise machined to have four bolt holes and then bent to shape.

To form the bracket, the sheet metal blank 121 is stamped as an integral unit with first and second sections 122 and 124 that are right regular parallelopipeds and a third section 126 extending from the second section and having a shape in plan of a truncated triangle but with the same thickness as the first section. Holes are drilled: (1) at 130 in the first section to permit a bolt to pass through the first section, an aligned hole in the crossarm and an aligned hole in the pole; (2) two holes 132 and 134 in the second section 124 to permit two bolts to pass through the second section and aligned holes in the crossarm; and (3) a hole 136 in the third section to permit a bolt to pass through the third section and an aligned hole in the pole 12 (FIGS. 1 and 9).

To form the bracket, the first section 122 of the blank 121 is bent with respect to the second section 124 to form a top section 96D (FIG. 10) of the bracket 20D that engages the outer surface of the crossarm 40 and the side section 92D of the bracket extending to the pole. The second section 124 of the blank is bent with respect to the third section 126 to form the pole engaging section 62D of the bracket parallel to the first section of the bracket, the outer surface of the crossarm and the longitudinal axis of the pole. The bracket 20D is formed in a similar manner, differing mainly in the holes that are drilled.

Figure 17:
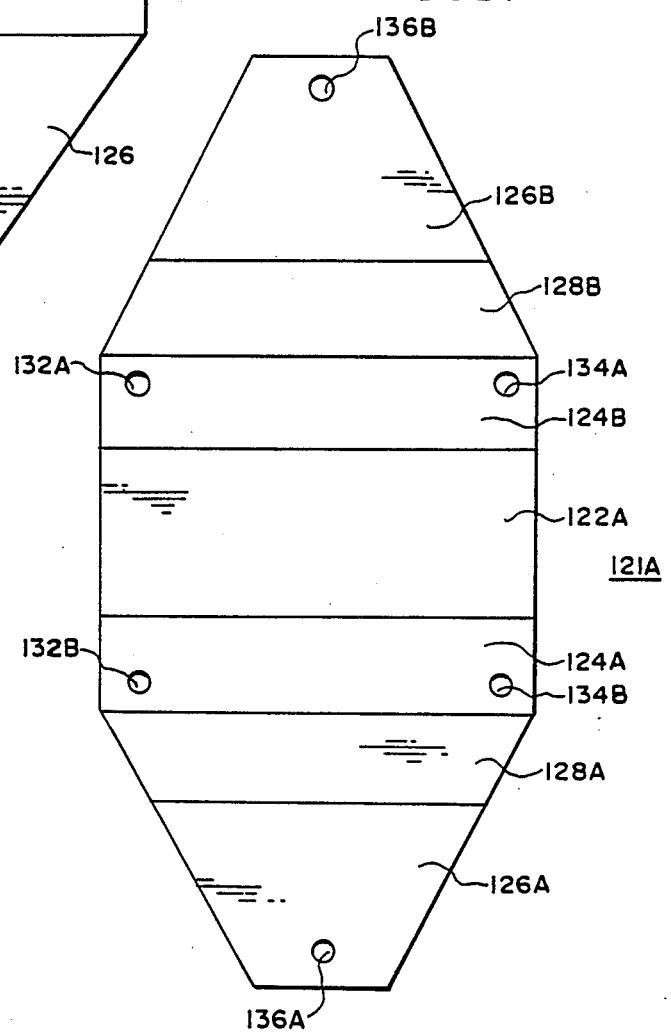
FIG. 17 is a sheet metal blank from which the crossarm brackets of FIGS. 14 and 15 may be formed.

In FIG. 17, there is shown a blank 121A of rolled steel or aluminum useful in forming the crossarm bracket 20E (FIG. 14). The blank 121A, like the blank 121, has a thickness of between 1/32 inch and 1 inch and is generally stamped from cold rolled steel or aluminum, punched, drilled or otherwise machined to have six holes and then bent to shape. The blank includes seven integrally formed sections, the first of which 122A forms the top section 74E of the bracket 20E, the second and third of which 124A and 124B form parallel side sections 92E and 94E, the fourth and fifth of which 128A and 128B form the connecting section 63E and 65E and the sixth and seventh of which 126A and 126B form the pole engaging sections 70E and 72E.

To accommodate bolts, holes are drilled: (1) in each of the second and third sections to permit bolts to pass through the aligned holes in the first and second sections and the crossarm 40 (FIG. 14) at 132B, 134B, 132A and 134A; and (2) through the sixth and seventh sections at 136A and 136B to permit different bolts to pass through corresponding holes in the sixth and seventh sections and corresponding aligned holes in the pole.

To form the bracket, the second and third blank sections are bent orthogonally to the first blank section toward the pole so they are parallel to each other, thus defining a first bracket section substantially coextensive with the first blank section. The second and third blank sections are each bent two more times to form second, third, fourth, fifth, sixth and seventh bracket sections. The second and third bracket sections are parallel to each other, the fourth and fifth sections each extend at an angle from respective ones of the second and third sections, and the sixth and seventh sections each extend at an angle to respective ones of the fourth and fifth sections and are in the same plan with each other and parallel with the first section.

After this process, the bracket has a first section that lies against the outer surface of the crossarm, second and third sections each of which extend part way along opposite sides of the crossarm, fourth and fifth sections each of which extend outwardly from the crossarm to the pole, and sixth and seventh sections that lie along the pole contain bolt holes at 136B and 136A for fastening to the pole. The first section may also include one or more holes to fasten them to the crossarm and pole with bolts and the second and third sections may include aligned bolt holes to permit fastening to the crossarm.

As can be understood from the above description, the brackets of this invention have several advantages, such as for example: (1) they are economical to make because they are formed from one piece of metal; and (2) they provide sufficient support to crossarms to prevent high-voltage three-phase wire or several phase wires from being moved into such close proximity to each other as to cause damage or disruption.

Although a preferred embodiment of the invention has been described with some particularity, many modifications and variations in the invention are possible within the light of the above teachings. It is therefore to be understood that, within the scope of the appended claims, the invention may be practiced other than as specifically described.

What is claimed is:

1. A crossarm bracket for mounting crossarms to utility poles each utility pole of which has a vertical longitudinal axis and holds high-voltage three-phase conductors, comprising:

a crossarm engaging portion and a utility pole engaging portion;

said crossarm engaging portion including at least first and second sections;

said first section being parallel to the longitudinal axis of the utility pole and spaced therefrom;

the second section being perpendicular to the longitudinal axis of the utility pole and to the first section, wherein said crossarm engaging portion is C-shaped and adapted to fit over a crossarm with the open end of the C being adapted to face the utility pole;

the dimensions of said first and second sections being the same as first and second dimensions of the crossarm, whereby the crossarm fits within said crossarm engaging portion of the crossarm bracket and the crossarm is in contact with inner surfaces of the crossarm engaging portion;

said first section including a bolt hole, whereby a bolt may pass through the crossarm and press the crossarm against the first section;

said utility pole engaging portion including at least a first flange extending outwardly in the direction of longitudinal axis of said utility pole from said second section of the crossarm engaging portion at an edge opposite to the first section of the crossarm engaging portion, whereby said utility pole engaging portion is adjacent to the utility pole and includes an open end where a crossarm will be positioned with an exposed surface adjacent to the utility pole;

said flange each including at least one bolt hole, whereby a bolt may pass through the utility pole and the flange to pull the flange against the utility pole;

said flange having an inner surface adapted to contact an outer surface of said utility pole;

the inner surface of said flange having substantially the same radius of curvature as the utility pole and extending outwardly a distance of between 2 inches and 12 inches, whereby said crossarm is stabilized;

said sections of said crossarm engaging portion and flange of said utility pole engaging portion being integrally formed of sheet metal, bent into the shape of the crossarm bracket.

2. A crossarm bracket according to claim 1 in which said crossarm bracket is formed of cold rolled steel.

3. A bracket according to claim 1 in which said crossarm bracket is formed of sheet aluminum.

4. A bracket in accordance with claim 1 in which:

said crossarm engaging portion includes at least one bolt hole in said second section and one bolt hole in said third section;

said bolt holes being aligned, whereby a bolt may pass through a crossarm between said second and third sections to hold the crossarm and crossarm bracket together.

5. A bracket in accordance with claim 1 in which said first section includes at least one bolt hole, whereby a bolt may pass through said first section and a crossarm, pressing the crossarm against the first section to keep it within said crossarm bracket by means of a bolt.

6. A bracket in accordance with claim 1 further including in the pole engaging portion a third section parallel to the second section, orthogonal to the first section and to the longitudinal axis of the utility pole, whereby a cross section of said crossarm engaging portion is C-shaped with the open end of the C facing the utility pole;

7. A bracket in accordance with claim 6 in which said third section is substantially triangular.

8. A crossarm assembly adapted to be mounted to a utility pole for holding three-phase high-voltage conductors comprising:

a crossarm;

a crossarm bracket fastened to said crossarm at a central location of said crossarm;

said crossarm being shaped substantially as a right regular parallelopiped;

said crossarm bracket including a crossarm engaging portion, first utility pole engaging portion and second utility pole engaging portion;

said crossarm engaging portion being C-shaped and fitting over a crossarm at a central location of the crossarm;

at least one bolt passing through said crossarm engaging portion and said crossarm to hold said crossarm engaging portion and crossarm together;

said first utility pole engaging portion extending in a first direction orthogonal to the longitudinal axis of said crossarm from the open end of said C and said second utility pole engaging portion extending in the opposite direction from the other open end of said C in a direction orthogonal to the longitudinal axis of said crossarm;

said first and second utility pole engaging portions having the same radius of curvature with a center being in an axis orthogonal to and spaced from said crossarm a distance of between 1 inch and 15 inches;

said sections of said crossarm engaging portion and flange of said utility pole engaging portion being integrally formed of sheet metal, bent into the shape of the crossarm bracket.

9. A utility pole mounting for high-voltage wires comprising a vertical utility pole;

an orthogonal crossarm;

a bracket mounting said crossarm to said utility pole;

said bracket including a first section in intimate contact with said crossarm spaced from said utility pole by said crossarm;

a second section orthogonal to said first section having a side in intimate contact with said crossarm and an edge in intimate contact with said utility pole;

a third section parallel to said second section and in intimate contact with said crossarm, having an edge of said third section in intimate contact with said utility pole;

a first flange integrally formed with said second section and having a curved portion in intimate contact with the outer surface of said utility pole;

a second flange integrally formed with said third section and having a curved surface in intimate contact with said utility pole;

at least one of said first, second and third sections including an aperture for receiving a bolt;

a bolt passing through said aperture and said crossarm, whereby said crossarm is securely mounted to said bracket;

said first and second flanges each including bolt holes; and a first bolt passing through an aperture of said first flange means and an aligned aperture in said utility pole and a second bolt passing through an aperture of said second flange and an aligned aperture in said utility pole, whereby said bracket is mounted to said utility pole to support said crossarm perpendicular thereto.

* * * * *